US011249696B2

(12) United States Patent
Park

(10) Patent No.: US 11,249,696 B2
(45) Date of Patent: Feb. 15, 2022

(54) CONVERTING VOICE COMMAND INTO TEXT CODE BLOCKS THAT SUPPORT PRINTING SERVICES

(71) Applicant: Hewlett-Packard Development Company, L.P., Spring, TX (US)

(72) Inventor: Sung Jin Park, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,718

(22) PCT Filed: Oct. 11, 2018

(86) PCT No.: PCT/KR2018/011914
§ 371 (c)(1),
(2) Date: Oct. 22, 2020

(87) PCT Pub. No.: WO2019/231055
PCT Pub. Date: Dec. 5, 2019

(65) Prior Publication Data
US 2021/0240403 A1 Aug. 5, 2021

(30) Foreign Application Priority Data
May 31, 2018 (KR) .................. 10-2018-0063014

(51) Int. Cl.
G06F 15/00 (2006.01)
G06F 3/12 (2006.01)
G06K 1/00 (2006.01)
G06F 3/0481 (2022.01)
G06F 3/16 (2006.01)
G10L 17/24 (2013.01)

(52) U.S. Cl.
CPC .......... *G06F 3/1205* (2013.01); *G06F 3/0481* (2013.01); *G06F 3/1222* (2013.01); *G06F 3/1236* (2013.01); *G06F 3/1289* (2013.01); *G06F 3/1292* (2013.01); *G06F 3/167* (2013.01); *G10L 17/24* (2013.01)

(58) Field of Classification Search
CPC .... G06F 3/1205; G06F 3/0481; G06F 3/1222; G06F 3/1236; G06F 3/1289; G06F 3/1292; G06F 3/167; G10L 17/24
USPC ................. 358/1.1, 1.15, 1.14, 1.13
See application file for complete search history.

(56) References Cited

U.S. PATENT DOCUMENTS 11,037,564 B2 * 6/2021 Jung ................ G10L 15/26
2012/0243028 A1 9/2012 Dumitrescu et al.
(Continued)

FOREIGN PATENT DOCUMENTS

EP 2 797 303 A1 10/2014
JP 2007-188001 A 7/2007
(Continued)

*Primary Examiner* — Douglas Q Tran
(74) *Attorney, Agent, or Firm* — Jefferson IP Law, LLP

(57) ABSTRACT

A cloud server for converting a voice command into text code blocks that support a printing service is presented. The cloud server includes a communicator, a processor, and a memory storing instructions executable by the processor. The processor executes the instructions to convert a voice command received from a user terminal through the communicator into text code blocks supporting a printing service and to control the communicator to transmit the text code blocks to the user terminal.

20 Claims, 9 Drawing Sheets

(56) References Cited

U.S. PATENT DOCUMENTS

| | | | |
|---|---|---|---|
| 2012/0245945 A1* | 9/2012 | Miyauchi | G10L 15/06 704/275 |
| 2014/0244258 A1 | 8/2014 | Song et al. | |
| 2015/0348551 A1 | 12/2015 | Gruber et al. | |
| 2016/0034253 A1 | 2/2016 | Bang et al. | |
| 2016/0150124 A1 | 5/2016 | Panda et al. | |
| 2016/0203002 A1 | 7/2016 | Kannan et al. | |
| 2017/0269889 A1 | 9/2017 | Nobutani et al. | |
| 2018/0211656 A1* | 7/2018 | Chong | G10L 17/00 |
| 2018/0288248 A1* | 10/2018 | Shen | H04N 1/00403 |
| 2019/0260884 A1* | 8/2019 | Nakajima | H04N 1/00474 |

FOREIGN PATENT DOCUMENTS

| | | |
|---|---|---|
| JP | 2013-153301 A | 8/2013 |
| JP | 2014-510942 A | 5/2014 |
| JP | 2014-203024 A | 10/2014 |
| JP | 2016-168707 A | 9/2016 |
| KR | 10-2017-0070649 A | 6/2017 |
| WO | WO-2017/039648 A1 | 3/2017 |

* cited by examiner

[Fig. 1]
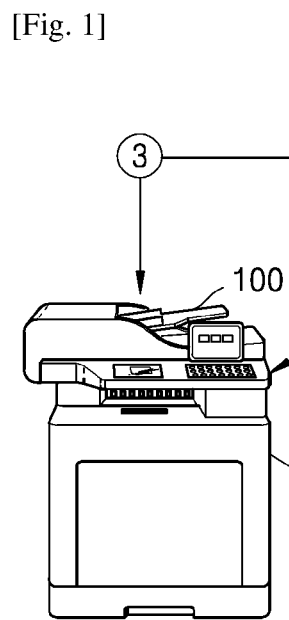

[Fig. 2]
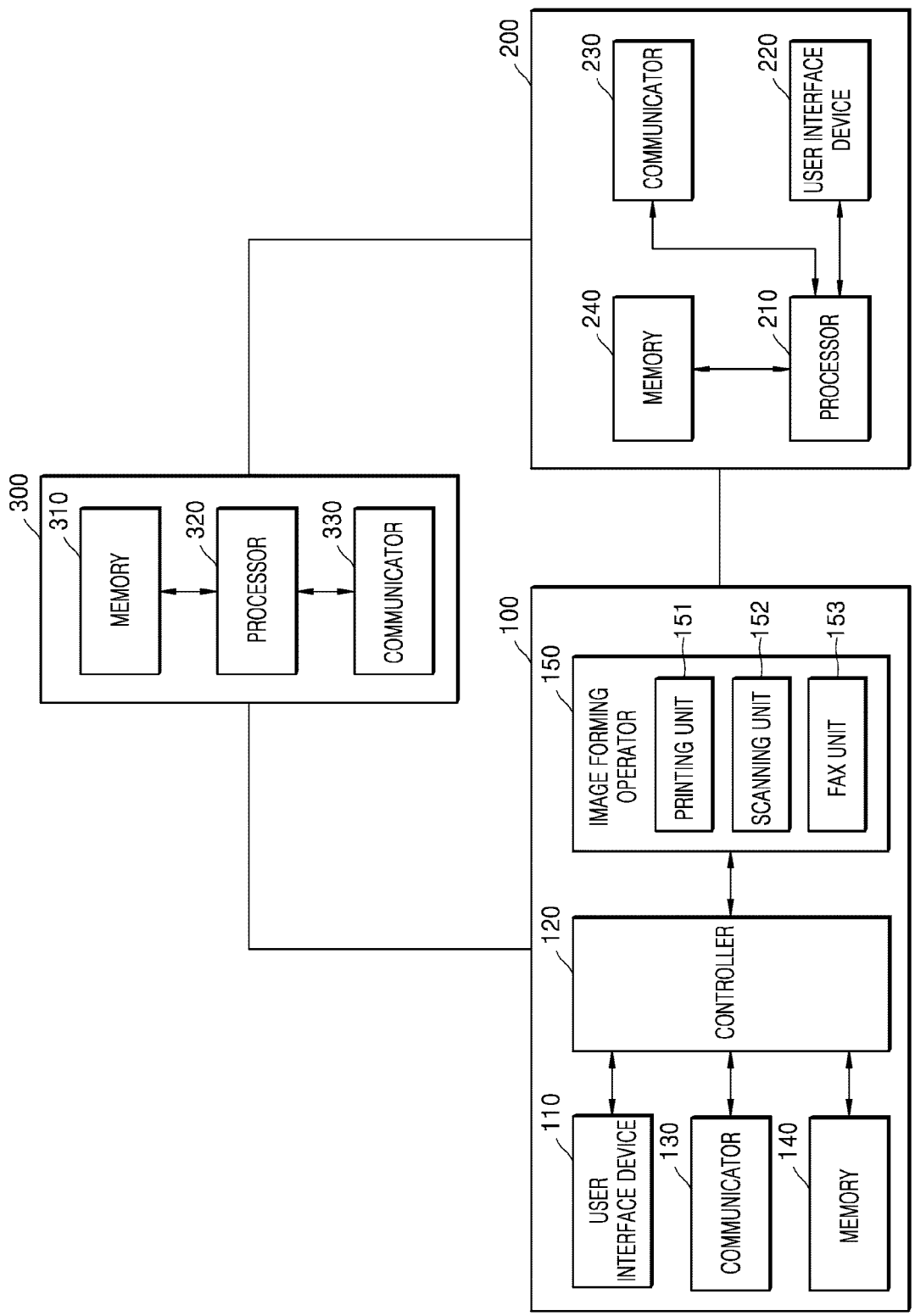

[Fig. 3]
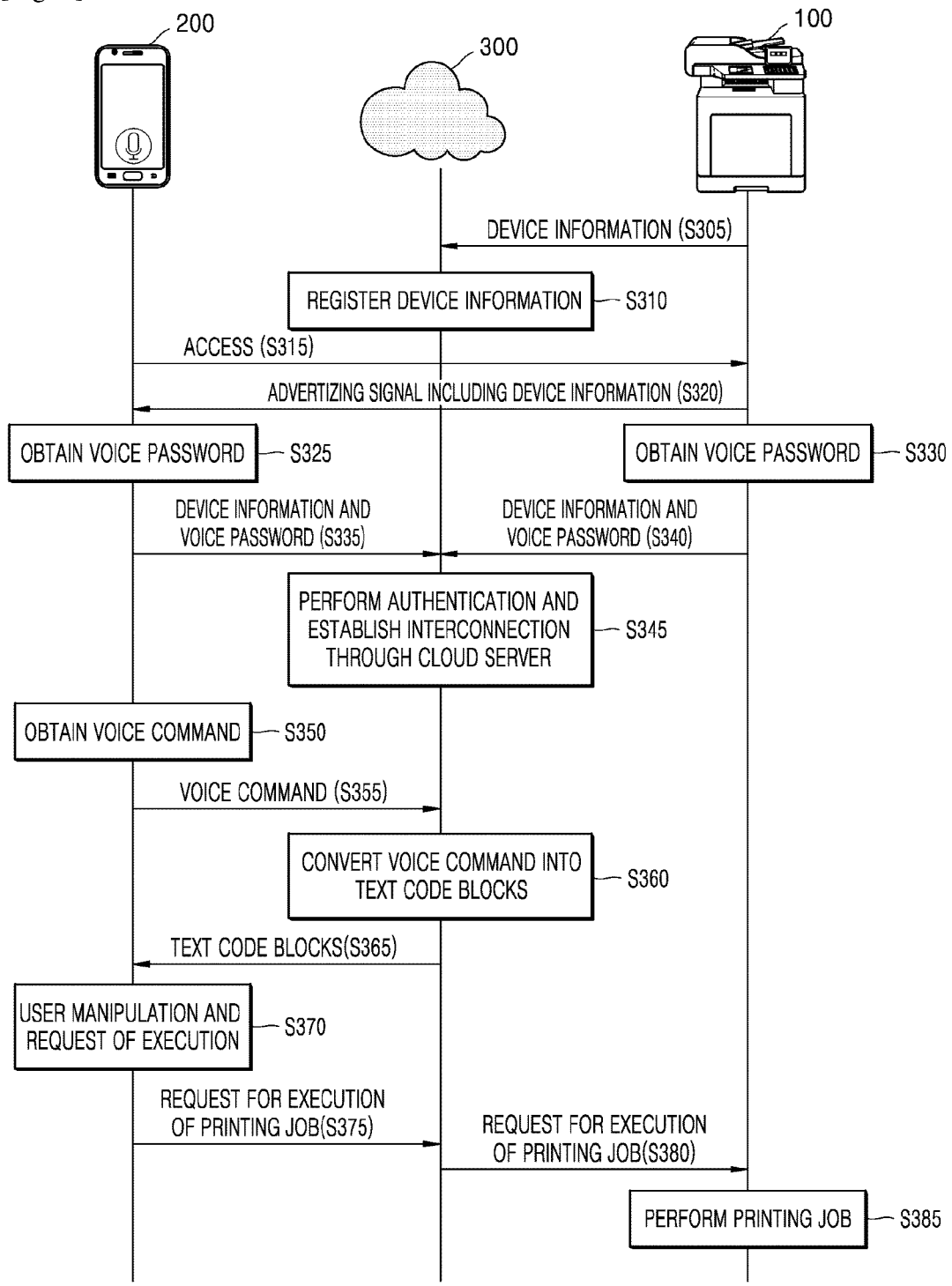

[Fig. 4]

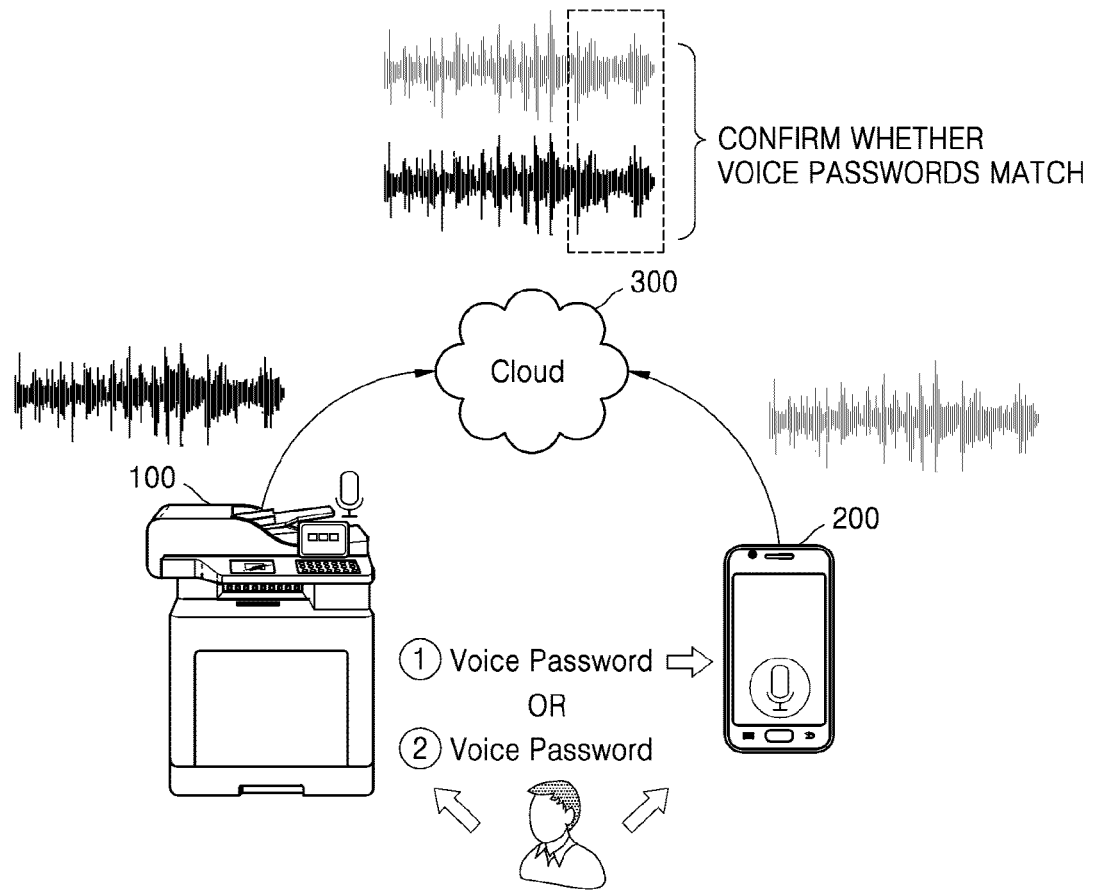

[Fig. 5]

| VOICE COMMAND | ANALYZE | PERFORM |
|---|---|---|
| VIEW DOCUMENT | PRINT DOCUMENT | PRINT DOCUMENT |
| UPLOAD | SCAN | SCAN PRINTER DOCUMENT AND THEN UPLOAD |
| SMALL | REDUCTION OPTION | REDUCTION SETTING IN OUTPUT OPTION |
| LARGE | ENLARGEMENT OPTION | ENLARGEMENT SETTING IN OUTPUT OPTION |
| VOICE COMMAND | ANALYZE | PERFORM |
| LATEST DOCUMENT | LATEST DOCUMENT | LATEST UPLOAD DOCUMENT |
| RECENT DOCUMENT | JUST DOCUMENT | LATEST OPEN DOCUMENT |
| FINAL DOCUMENT | FINAL DOCUMENT | LATEST EDIT DOCUMENT |
| VOICE COMMAND | ANALYZE | PERFORM |
| CLEAR | Sharpen | APPLY SHARPNESS IMAGE FILTER |
| EASY TO READ | Font up | ENLARGE FONT SIZE |

[Fig. 6]

| VOICE COMMAND | DERIVED COMMAND (Pre-defined) | COMMAND OPTIMIZED TO USER |
|---|---|---|
| SMALL | SLIGHTLY SMALL (10-20%)<br>MODERATELY SMALL (30%)<br>VERY SMALL (50%) | MODERATELY SMALL (30%) |
| EASY TO READ | Font size up to 14p<br>CHANGE FONT TYPE<br>PROCESS BOLD<br>SENTENCE SPACE 120% | Font size 14p,<br>SENTENCE SPACE 120% |
| CLEAR | IMAGE SHARPENING<br>IMAGE CONTRAST INCREASE<br>FONT ANTI-ALIAS RELEASE<br>COLOR POSTERIZING<br>TEXT BLACK, IMAGE LEVEL ADJUST | IMAGE CONTRAST INCREASE |

[Fig. 7]
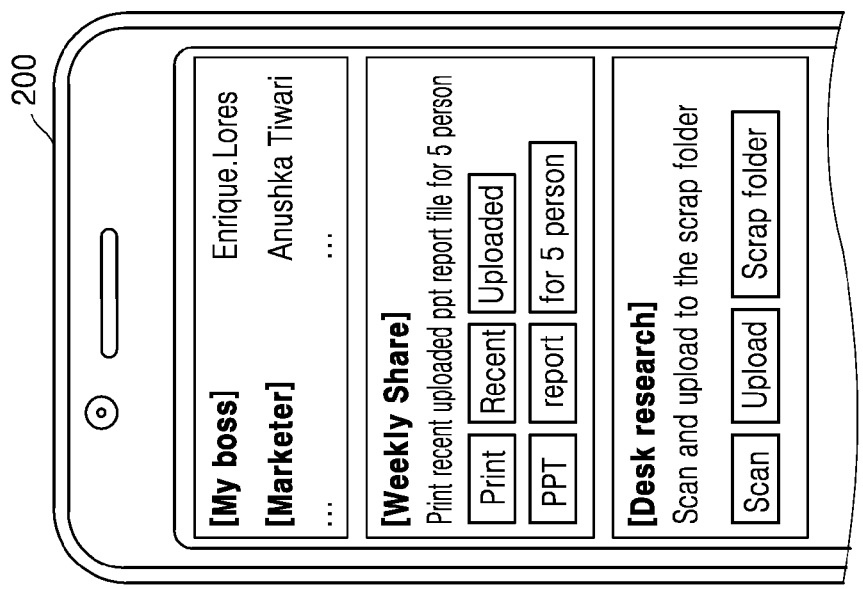
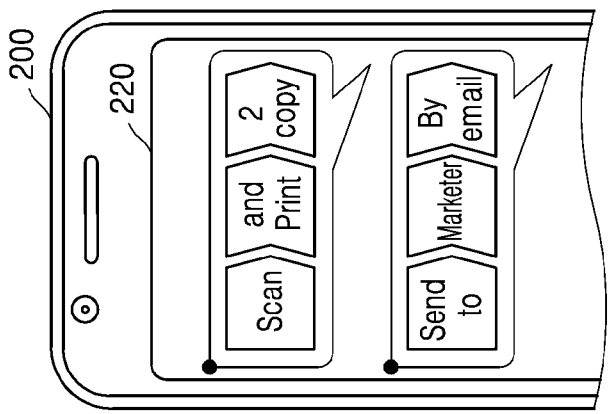
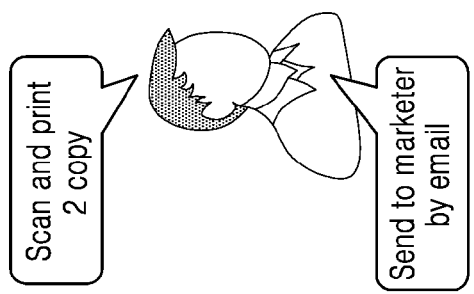

[Fig. 8]
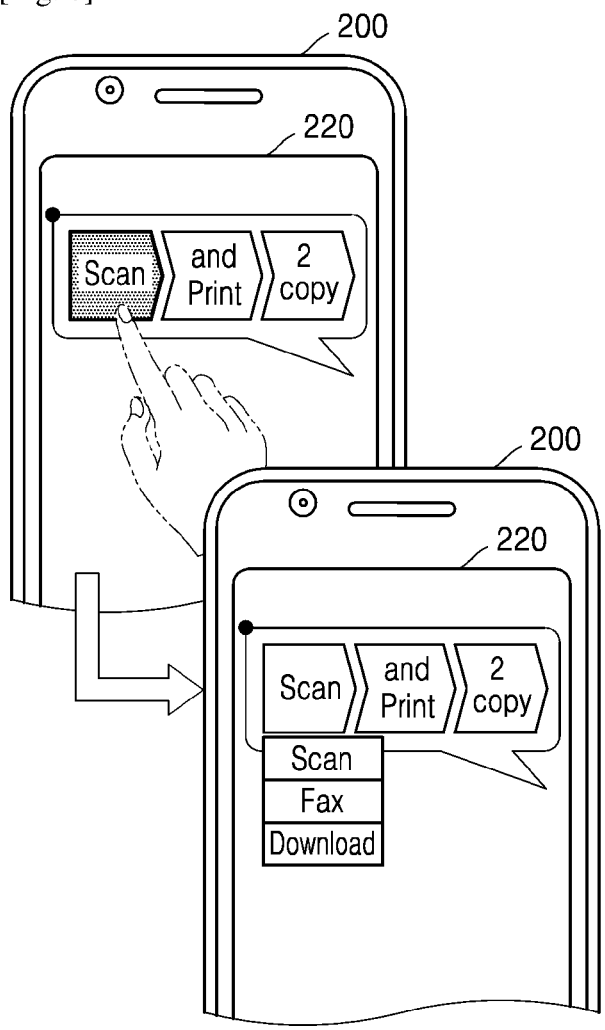

[Fig. 9]
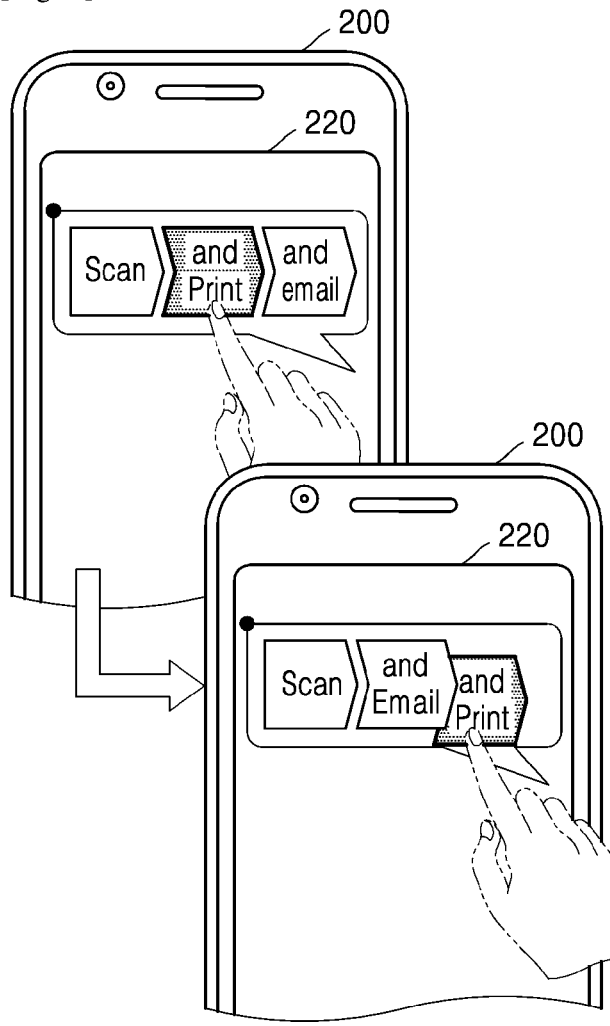
[Fig. 10]
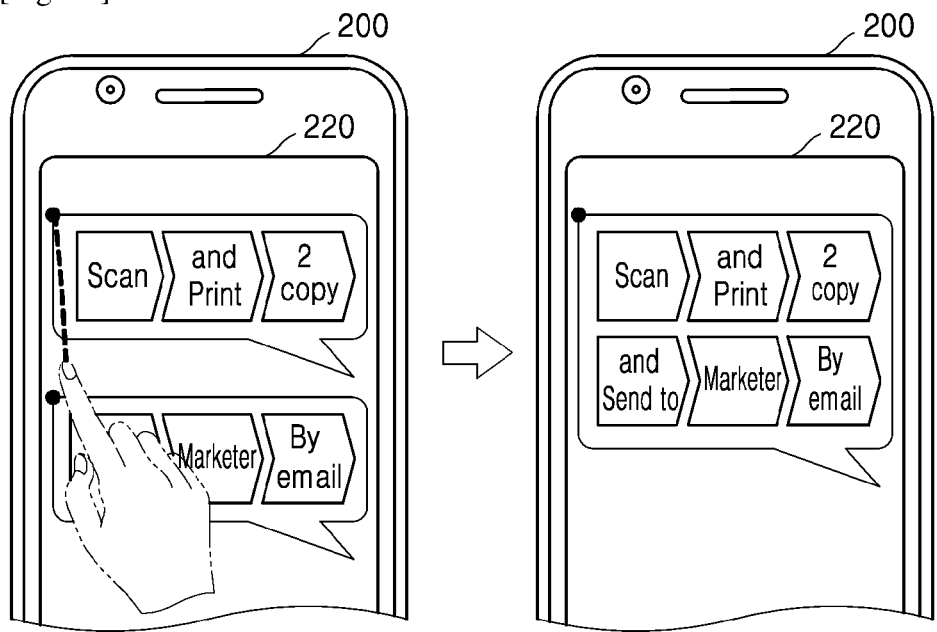

[Fig. 11]
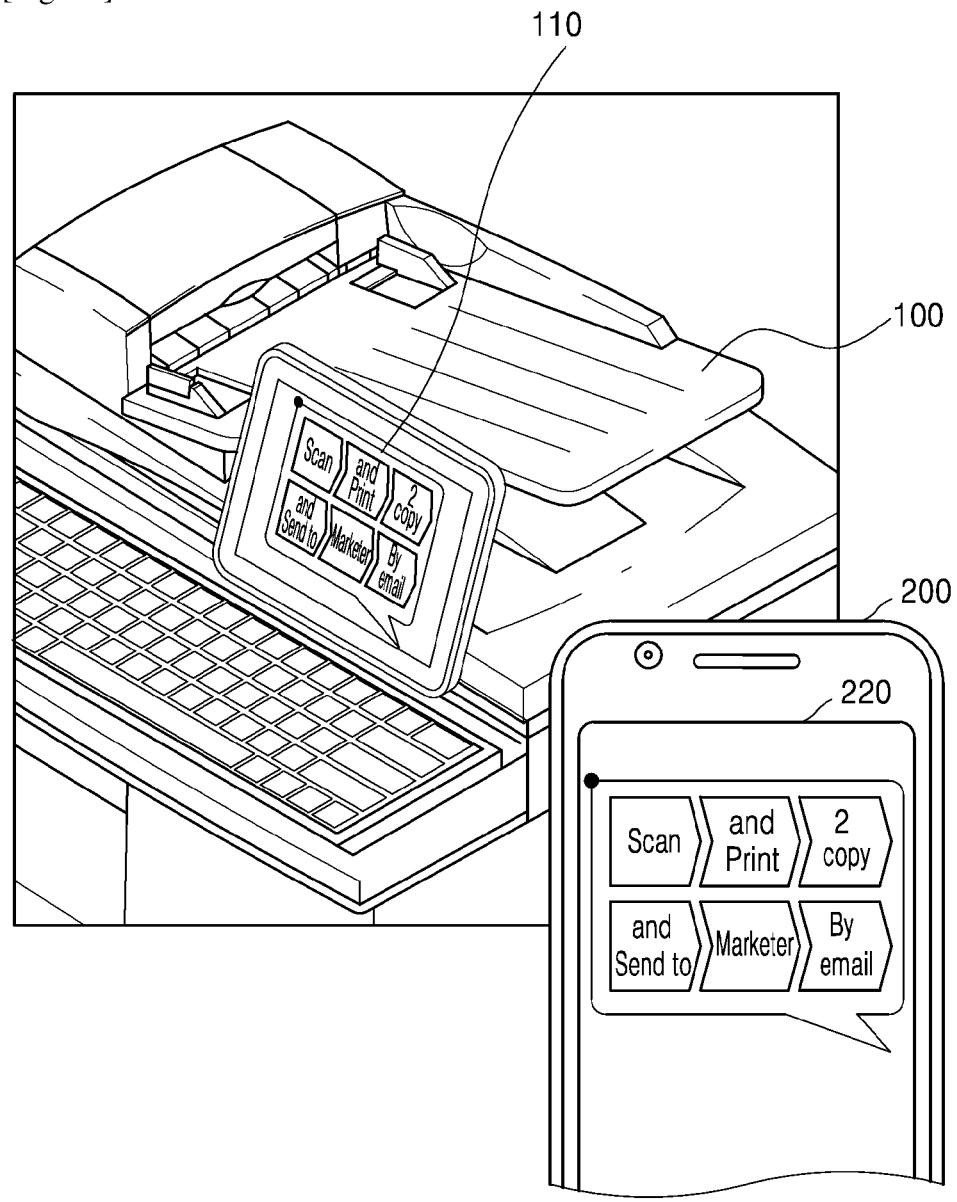

CONVERTING VOICE COMMAND INTO TEXT CODE BLOCKS THAT SUPPORT PRINTING SERVICES

BACKGROUND ART

A user may remotely control an image forming apparatus, such as a printer, a copier, a facsimile machine, a multifunction apparatus, and the like, through a user terminal without having to directly manipulate the image forming apparatus. Such remote control increases the convenience for the user of the image forming apparatus.

To provide a printing service, various devices may be connected to each other using wired/wireless communication technology, and complex operations may be processed through cloud computing.

DISCLOSURE OF INVENTION

BRIEF DESCRIPTION OF DRAWINGS

The above and other aspects, features, and advantages of certain examples of the present disclosure will be more apparent from the following description taken in conjunction with the accompanying drawings, in which:

FIG. 1 is a diagram for explaining a printing service environment including an image forming apparatus, a user terminal, and a cloud server, according to an example;

FIG. 2 is a diagram for explaining a configuration and an operation of each of an image forming apparatus, a user terminal, and a cloud server, according to an example;

FIG. 3 is a diagram for explaining a process of executing a printing job using a voice command, according to an example;

FIG. 4 is a diagram for explaining an image forming apparatus and a user terminal performing user authentication using voice passwords, according to an example;

FIG. 5 is a diagram for explaining an instructions mapping table specialized for a printing service used when a cloud server converts a voice command into text code blocks, according to an example;

FIG. 6 is a diagram for explaining an example in which a cloud server converts a voice command into text code blocks based on a language habit of a user, according to an example;

FIG. 7 is a diagram for explaining text code blocks converted from voice commands and supporting a printing service, according to an example;

FIG. 8 is a diagram illustrating a user terminal providing a menu corresponding to a selected text code block in response to a user manipulation selecting the text code block, according to an example;

FIG. 9 is a diagram illustrating a user terminal changing an order of text code blocks in response to a user manipulation moving a text code block, according to an example;

FIG. 10 is a diagram illustrating a user terminal merging sets of text code blocks, according to an example; and FIG. 11 is a diagram for explaining an example in which a user interface device of a user terminal and a user interface device of an image forming apparatus interact with each other and the user interface devices simultaneously process multiple manipulations of a user, according to an example.

Throughout the drawings, it should be noted that like reference numbers are used to depict the same or similar elements, features, parts, components, and structures.

MODE FOR THE INVENTION

Hereinafter, various examples will be described with reference to the accompanying drawings. The examples described may be modified in many different forms. To more clearly describe features of examples, matters well known to one of ordinary skill in the art to which the below examples pertain will not be described in detail. In the following description and drawings, components having substantially the same function and configuration are denoted by the same reference numerals, and redundant description thereof will be omitted.

In the specification, when an element is "connected" to another element, the elements may not only be "directly connected," but may also be "electrically connected" or otherwise "indirectly connected" via another element therebetween. Also, when a region "includes" an element, the region may further include another element instead of excluding the other element, unless otherwise differently stated.

FIG. 1 is a diagram for explaining a printing service environment including an image forming apparatus, a user terminal, and a cloud server, according to an example.

Referring to FIG. 1, an image forming apparatus 100 may perform image forming operations such as printing, scanning, copying, or faxing. The image forming apparatus 100 may form an image on a recording medium such as a printing paper by using various printing methods such as an electrophotographic method, an inkjet method, a thermal transfer method, a direct thermal method, or the like. A user terminal 200 may be a computing device such as a smart phone, a notebook, or the like. A cloud server 300 may support a printing service and provide a response to a request when requested by the image forming apparatus 100 or the user terminal 200.

In FIG. 1, a schematic sequence in which the user terminal 200 controls the image forming apparatus 100 to connect the image forming apparatus 100 to the user terminal 200 to perform a printing job is shown in sequences ①, ②, ③, and ④.

In the first sequence ①, the user terminal 200 may access the image forming apparatus 100 supporting the printing service and execute a printing application supporting a voice command installed in the user terminal 200. Since the printing application supporting the voice command is executed, the user terminal 200 may scan an advertising signal repeatedly transmitted from the neighboring image forming apparatus 100 and obtain device information of the image forming apparatus 100. For example, the advertising signal may be a Bluetooth low energy (BLE) beacon signal, a wireless fidelity (Wi-Fi) aware signal, or the like.

In the second sequence ②, the user terminal 200 may request a connection of the image forming apparatus 100 using the device information of the image forming apparatus 100 through communication between the user terminal 200 and the cloud server 300 and confirm that the printing service using the voice command is supported.

In the third sequence ③, the cloud server 300 may inform the image forming apparatus 100 of a connection request of the user terminal 200 and establish a connection between voice command sessions of the image forming apparatus 100 and the cloud server 300.

In the fourth sequence ④, the cloud server 300 may receive a voice command from the user terminal 200 and transmit a request for executing a printing job related to the received voice command to the image forming apparatus 100 through voice recognition and natural language processing.

Examples of operations of the image forming apparatus 100, the user terminal 200, and the cloud server 300 in a printing service environment supporting the voice command will now be described in more detail with reference to FIGS. 2 to 11.

FIG. 2 is a diagram for explaining a configuration and an operation of each of an image forming apparatus, a user terminal, and a cloud server, according to an example.

Referring to FIG. 2, the image forming apparatus 100 may include a user interface device 110, a controller 120, a communicator 130, a memory 140, and an image forming operator 150. Further, although not shown, the image forming apparatus 100 may include a power supply for supplying power to the respective components.

The user interface device 110 may include an input unit for receiving an input for performing an image forming operation from a user and an output unit for displaying information about a result of the image forming operation or a state of the image forming apparatus 100. For example, the user interface device 110 may include an operation panel for receiving a user input and a display panel for displaying a screen.

As an example, the input may include devices capable of receiving various types of user input such as a keyboard, a physical button, a touch screen, a camera, a microphone, or the like. Further, the output unit may include, for example, a display panel, a speaker, or the like. However, the present disclosure is not limited to this, and the user interface device 110 may include various input/output supporting devices.

The controller 120 may control an operation of the image forming apparatus 100 and may include at least one processor such as a central processing unit (CPU). The controller 120 may control other components included in the image forming apparatus 100 to perform an operation corresponding to the user input received through the user interface device 110. The controller 120 may include at least one specialized processor corresponding to each function, or may be a single integrated processor.

For example, the controller 120 may execute a program stored in the memory 140, read data or a file stored in the memory 140, or store a new file in the memory 140.

The communicator 130 may perform wired/wireless communication with another device or a network. To this end, the communicator 130 may include a communication module, such as a transceiver, supporting at least one of various wired/wireless communication methods. For example, the communication module may be in the form of a chipset, or may be a sticker/barcode (e.g., a sticker including a near-field communication (NFC) tag) including information necessary for communication.

Wireless communication may include, for example, at least one of Wi-Fi, Wi-Fi Direct, Bluetooth, BLE, ultra-wide band (UWB), NFC, or the like. Wired communication may include, for example, at least one of universal serial bus (USB), High-Definition Multimedia Interface (HDMI), or the like.

The communicator 130 may be connected to an external device located outside the image forming apparatus 100 and may transmit and receive signals or data. The communicator 130 may transmit signals or data received from the user terminal 200 or the cloud server 300 to the controller 120 or transmit signals or data generated by the controller 120 to the user terminal 200 or the cloud server 300. The communicator 130 may be directly connected to the cloud server 300 and may transmit and receive signals or data. Also, the communicator 130 may be connected to the user terminal 200 through the cloud server 300. That is, the communicator 130 of the image forming apparatus 100 may transmit/receive signals or data to/from a communicator 230 of the user terminal 200 through the cloud server 300.

The memory 140 may install and store programs such as applications and various types of data such as files. The controller 120 may access the data stored in the memory 140 and use the data or store new data in the memory 140. Further, the controller 120 may execute the programs installed in the memory 140, and may install an application received from outside through the communicator 130 in the memory 140.

The image forming operator 150 may perform an image forming operation such as printing, scanning, copying, or faxing. In FIG. 2, the image forming operator 150 is shown as including a printing unit 151, a scanning unit 152, and a fax unit 153. However, the image forming operator 150 may include only some of these components or may further include components for performing other kinds of image forming operations.

The printing unit 151 may form an image on a recording medium by using various printing methods such as an electrophotographic method, an inkjet method, a thermal transfer method, a direct thermal method, or the like.

The scanning unit 152 may irradiate light onto a document, receive the reflected light, and read an image recorded in the document. For example, a charge-coupled device (CCD) or a contact image sensor (CIS) may be employed as an image sensor for reading the image from the document.

The fax unit 153 may share a configuration for scanning an image with the scanning unit 152, may share a configuration for printing a received file with the printing unit 151, may transmit a scan file to a destination, or may receive a file from outside.

The user terminal 200 may include a processor 210, a user interface device 220, the communicator 230, and a memory 240.

The processor 210 may control an operation of the user terminal 200 and may include at least one processing unit such as a CPU. The processor 210 may control other components included in the user terminal 200 to perform operations corresponding to user inputs received via the user interface device 220. The processor 210 may include at least one specialized processing unit corresponding to each function. The processor 210 may execute a program stored in the memory 240, read data or files stored in the memory 240, or store a new file in the memory 240.

The user interface device 220 may include an input unit for obtaining a user input and an output unit for providing information to the user. For example, the input unit may be an operation panel capable of receiving a user manipulation or a microphone capable of acquiring a voice or noise of the user. The output unit may be a display panel for displaying a screen or a speaker.

The user terminal 200 may be connected to an external device such as the image forming apparatus 100 or the cloud server 300 through the communicator 230. To this end, the communicator 230 may include a transceiver and support at least one of Wi-Fi, Wi-Fi Direct, Bluetooth, BLE, UWB, 3G, 4G, and 5G.

The memory 240 may store instructions executable by the processor 210. The memory 240 may install and store programs such as applications and various types of data such as files. The memory 240 may store an operating system.

The cloud server 300 may include a memory 310, a processor 320, and a communicator 330. The memory 310 may store instructions executable by the processor 320. The processor 320 may control an operation of the cloud server 300 and may include at least one processing unit. The communicator 330 may include a communication module, such as a transceiver, that may communicate with the communicator 130 of the image forming apparatus 100 or the communicator 230 of the user terminal 200.

The image forming apparatus 100, the user terminal 200, and the cloud server 300 described above may be used to perform a printing operation through a printing service supporting voice commands. For example, the processor 210 of the user terminal 200 may execute commands stored in the memory 240 to transmit voice commands obtained from the user to the cloud server 300 providing the printing service. The processor 320 of the cloud server 300 may control the communicator 330 to execute the commands stored in the memory 310, convert the voice command received from the user terminal 200 through the communicator 330 into text code blocks supporting the printing service, and transmit the text code blocks to the user terminal 200. The processor 320 of the cloud server 300 may control the communicator 330 to search for text code blocks corresponding to a command that is similar to a command of the text code blocks in terms of pronunciation or function and transmit the retrieved text code blocks to the user terminal 200. The processor 210 of the user terminal 200 may control the communicator 230 to receive the text code blocks supporting the printing service from the cloud server 300 and may control the user interface device 220 to display the text code blocks on the user interface device 220. In response to a printing job execution request of the user terminal 200 based on the voice command, the printing job execution request may be transmitted to the image forming apparatus 100 through the cloud server 300, and the printing operation may be performed. Hereinafter, a process of performing a printing job using a voice command will be described with reference to FIG. 3.

FIG. 3 is a diagram for explaining a process of executing a printing job using a voice command, according to an example.

Referring to FIG. 3, the cloud server 300 may receive device information about the image forming apparatus 100 from the image forming apparatus 100 in operation S305.

The cloud server 300 may register the device information of the image forming apparatus 100 by storing the device information about the image forming apparatus 100 in operation S310.

A user who wishes to execute the printing job may access the image forming apparatus 100 with the user terminal 200 in operation S315.

The image forming apparatus 100 may repeatedly transmit an advertising signal including the device information on a space corresponding to a predetermined range in operation S320. At this time, the advertising signal may be a BLE beacon signal or a Wi-Fi aware signal. The user terminal 200 may receive the advertising signal repeatedly transmitted from the image forming apparatus 100 and use the device information about the image forming apparatus 100 to use a printing service.

When the user terminal 200 and the image forming apparatus 100 are located in a predetermined space, each of the user terminal 200 and the image forming apparatus 100 may obtain sound information generated in the image forming apparatus 100 or a keyword phrase spoken by the user as a voice password in operations S325 and S330. As an example, the predetermined space may be a region within a range that is reached by the advertising signal repeatedly transmitted by the image forming apparatus 100 and may be a space in which each of the image forming apparatus 100 and the user terminal 200 collect the voice password together. Since the user terminal 200 and the image forming apparatus 100 collect sound generated in the predetermined space together, each of the user terminal 200 and the image forming apparatus 100 may collect similar sound as the voice password.

The user terminal 200 and the image forming apparatus 100 may transmit the device information and the voice password to the cloud server 300 for user authentication in operations S335 and S340.

The cloud server 300 may confirm whether the voice passwords respectively received from the image forming apparatus 100 and the user terminal 200 match with each other, perform user authentication, and establish interconnection through the cloud server 300 in operation S345. The image forming apparatus 100 and the user terminal 200 may obtain information necessary for establishing a connection between the image forming apparatus 100 and the user terminal 200 from the cloud server 300. When a security method using both a network for receiving the advertising signal repeatedly transmitted by the image forming apparatus 100 and the voice password based on sound generated in the predetermined space for collecting the voice password together is applied, logical security and physical security may be performed together.

FIG. 4 is a diagram for explaining an image forming apparatus and a user terminal performing user authentication using voice passwords, according to an example.

Referring to FIG. 4, a security method using voice passwords according to operations S325, S330, S335, S340, and S345 described in FIG. 3 is shown. When the user terminal 200 and the image forming apparatus 100 are located in a predetermined space, each of the user terminal 200 and the image forming apparatus 100 may obtain sound information (in the case of ①) generated in the image forming apparatus 100 or a keyword phrase (in the case of ②) spoken by a user as the voice password and transmit the voice password to the cloud server 300. The cloud server 300 may confirm whether the voice passwords respectively received from the image forming apparatus 100 and the user terminal 200 match with each other, perform user authentication, and establish interconnection through the cloud server 300. The cloud server 300 may determine whether the voice passwords match based on unique features identified in the voice passwords. As an example, the cloud server 300 may confirm whether there is a match between the two voice passwords through a convolution operation on the received voice passwords to confirm whether the voice passwords match. When the voice passwords match, it may be proved that the user terminal 200 and the image forming apparatus 100 are in the same space in the physical sense.

Referring again to FIG. 3, the user terminal 200 may obtain the voice command from the user who wishes to perform the printing job in operation S350.

The user terminal 200 may transmit the voice command obtained from the user to the cloud server 300 providing the printing service in operation S355.

The cloud server 300 may convert the voice command received from the user terminal 200 into text code blocks supporting the printing service in operation S360. The cloud server 300 may analyze a relationship between the received voice command and a previous voice command to determine a context of the printing job according to a request of the user terminal 200 and convert the received voice command into the text code blocks based on the context. The cloud server 300 may accurately determine a type of the printing job or a current situation that the user wishes to execute through the continuous voice commands.

The cloud server 300 may generate the text code blocks corresponding to the voice command based on an instructions mapping table specialized for the printing service for one voice command or a language habit of the user.

FIG. 5 is a diagram for explaining an instructions mapping table specialized for a printing service used when a cloud server converts a voice command into text code blocks, according to an example.

Referring to FIG. 5, the cloud server 300 may convert the received voice command into the text code blocks based on the instructions mapping table specialized for the printing service. In FIG. 5, an example of an instructions mapping table specialized for a printing service is shown, but the instructions mapping table is not limited thereto.

In the example of FIG. 5, it may be known in what sense the cloud server 300 interprets the received voice command and what functions the cloud server 300 generates the text code blocks to perform. For example, when the voice command is "upload," the cloud server 300 may interpret the voice command as a "scan" function and generate the text code blocks to scan a print document and then upload the scanned print document to a predetermined space. Also, the cloud server 300 may accurately identify features of the document for voice commands of similar format such as "latest document," "recent document," and "final document" and determine the document on which the printing job is to be performed. Also, when the voice command has expressions such as "small," "large," "clear," and "easy to read," the cloud server 300 may limitedly interpret the expressions as being related to the printing job and reflect the expressions to generate the text code blocks. For example, the expression "small" may be interpreted to mean lowering of a voice, but in the instructions mapping table specialized for the printing service, the cloud server 300 may interpret the expression as meaning to reduce output of the printing job and generate the text code blocks.

FIG. 6 is a diagram for explaining an example in which a cloud server converts a voice command into text code blocks based on a language habit of a user, according to an example.

Referring to FIG. 6, the cloud server 300 may convert the received voice command into the text code blocks based on a learned language habit of a user. The cloud server 300 may learn the language habit of the user through machine learning based on a language learning model and accurately determine the intended or desired meaning of the voice command intended by the user based on the learned language habit.

In the example of FIG. 6, when the voice command includes an expression "small," a value of a reduction option may be determined based on the language habit of the existing user with respect to the value of the reduction option. In other words, there may be derived commands such as "slightly small (10-20%)," "moderately small (30%)," and "very small (50%)" with respect to the expression "small." The cloud server 300 may determine "small" spoken by a user A as a command to reduce "moderately small (30%)" based on the language habit of the user and a history of past printing jobs and accordingly generate the text code blocks.

Referring again to FIG. 3, the cloud server 300 may transmit the text code blocks to the user terminal 200 in operation S365. The cloud server 300 may search for not only the text code blocks corresponding to the voice command but also text code blocks corresponding to a command that is similar to a command of the text code blocks in terms of pronunciation or function and transmit the found text code blocks to the user terminal 200.

The user terminal 200 may display the text code blocks supporting the printing service received from the cloud server 300 on the user interface device 220 and receive a user manipulation for the text code blocks and a request for execution of the printing job in operation S370. Examples of the text code blocks and the user manipulation with respect to the text code blocks will be described with reference to FIGS. 7 to 10.

FIG. 7 is a diagram for explaining text code blocks converted from voice commands and supporting a printing service, according to an example.

Referring to FIG. 7, with respect to voice commands "Scan and print 2 copy" and "Send to marketer by email" of a user, the text code blocks converted from each voice command by the cloud server 300 are displayed on the user interface device 220. A set of the text code blocks corresponding to each voice command may be displayed separately by speech bubbles as shown on the user interface device 220 in FIG. 7. Each unit voice corresponding to a function of an image forming apparatus constituting the voice command and a printing job option may be separately displayed as a unit code block. For example, as shown in FIG. 7, the voice command "Scan and print 2 copy" may be divided into functions of the image forming apparatus such as "Scan" and "and print" and the printing job option such as "2 copy" and may be displayed as a total of three unit code blocks. The unit code blocks may be displayed in different colors.

The text code blocks may be stored in the user terminal 200 according to categories such as the user, time, etc., such that the user may confirm history information of the text code blocks executed in the user terminal 200 and reuse the text code blocks.

The user may edit the text code blocks through the user interface device 220 of the user terminal 200 to compensate for incompleteness of the voice command or lack of conversion into the text code blocks.

FIG. 8 is a diagram illustrating a user terminal providing a menu corresponding to a selected text code block in response to a user manipulation selecting the text code block, according to an example.

Referring to FIG. 8, the user interface device 220 of the user terminal 200 may display a menu including at least one text code block corresponding to a command that is similar to a command of a selected text code block in terms of pronunciation or function below the selected text code block in response to the user manipulation selecting one of text code blocks. In FIG. 8, it may be seen that when a user selects a text code block "Scan" from among the text code blocks, a menu including text code blocks "Fax" and "Download" corresponding to a functionally similar command that may be performed in place of "Scan" may be displayed below the selected text code block.

FIG. 9 is a diagram illustrating a user terminal changing an order of text code blocks in response to a user manipulation moving a text code block, according to an example.

Referring to FIG. 9, the user interface device 220 of the user terminal 200 may change and display the order of the text code blocks according to a position of the moved text code block in response to the user manipulation of moving one of the text code blocks. In FIG. 9, it may be seen that when a user selects a text code block "and Print" from among the text code blocks and drags and drops the text code block "and Print" behind a text code block "and Email," the order of the text code blocks may be changed such that text code blocks "Scan and Print and Email" may be changed to text code blocks "Scan and Email and Print." When the user makes a voice command and determines that it is necessary to change the order that a function requiring a short time is firstly processed in consideration of time required for processing each function, the order of the text code blocks may be changed as shown in FIG. 9.

FIG. 10 is a diagram illustrating a user terminal merging sets of text code blocks, according to an example.

Referring to FIG. 10, the user interface device 220 of the user terminal 200 may display overlapped sets as one set of text code blocks in response to a user manipulation of overlapping any one of the sets of text code blocks corresponding to each of a plurality of voice commands with the other set. In FIG. 10, it may be seen that when a user performs a user manipulation selecting a set of text code blocks "Scan and Print 2 Copy" and merging the set of text code blocks "Scan and Print 2 Copy" with a set of text code blocks "Send to Marketer By email," one set of text code blocks "Scan and Print 2 Copy Send to Marketer By email" may be generated and displayed. In FIG. 10, it may be seen that the two sets of text code blocks may be merged into one set through the user manipulation touching a part of a speech bubble icon corresponding to the set of text code blocks "Scan and Print 2 Copy" and linking parts of a speech bubble icon corresponding to the set of text code blocks "Send to Marketer By email." However, the user manipulation merging the sets of text code blocks may use various methods, and thus the present disclosure is not limited thereto.

Referring again to FIG. 3, the user terminal 200 may transmit the request for execution of the printing job to the cloud server 300 in operation S375. At this time, when replaceable information is included in the text code blocks and corresponds to information stored in the user terminal 200, the replaceable information may be replaced with the corresponding information stored in the user terminal 200 at the request of execution of the printing job and transmitted to the image forming apparatus 100 through the cloud server 300. For example, when there are text code blocks "Send to Marketer By email," and corresponding email address information of "Marketer" is stored in the user terminal 200, the request for execution of the printing job may be transmitted after replacing "Marketer" with the corresponding email address information.

The cloud server 300 may transmit the request for execution of the printing job to the image forming apparatus 100 corresponding to the printing job according to the request for execution of the printing job received from the user terminal 200 in operation S380.

The image forming apparatus 100 may execute the printing job in response to the request for execution of the printing job in operation S385.

In an example, when the user attempts to start the printing service supported by the cloud server 300 using the user terminal 200 or requests execution of the printing job from the image forming apparatus 100, there may be cases in which user multi-manipulation is required. For example, there may be a case in which the user wishes to view content displayed on the user interface device 220 and perform a user manipulation on the displayed text code blocks while instructing a microphone of the user terminal 200 with a voice command. In such a case, it may be difficult for the user to simultaneously process the user multi-manipulation with one user terminal 200.

FIG. 11 is a diagram for explaining an example in which a user interface device of a user terminal and a user interface device of an image forming apparatus interact with each other and the user interface devices simultaneously process multiple manipulations of a user, according to an example.

Referring to FIG. 11, the user interface device 220 of the user terminal 200 may interact with the user interface device 110 of the image forming apparatus 100 performing a printing job according to a request for execution by the user terminal 200 in real time and simultaneously process the user multi-manipulation for progress of the printing job with the user interface device 110 of the image forming apparatus 100. As shown in FIG. 11, the user interface device 220 of the user terminal 200 may interact with the user interface device 110 of the image forming apparatus 100 and provide the same screen in real time. In this case, the user may make a voice command using the user terminal 200 and simultaneously edit text code blocks displayed on the user interface device 110 of the image forming apparatus 100. To this end, the real time interaction between the user interface device 220 of the user terminal 200 and the user interface device 110 of the image forming apparatus 100 may be performed in a wireless local area network between the user terminal 200 and the image forming apparatus 100 and printing data for the printing job may be transmitted to the image forming apparatus 100 through the cloud server 300. Thus, immediate feedback may be transmitted to the user terminal 200 and the image forming apparatuses 100 through a communication using the wireless local area network between the user terminal 200 and the image forming apparatuses 100 without passing through the cloud server 300.

The above description may be implemented in the form of a non-transitory computer-readable storage medium storing instructions or data executable by a computer or a processor. The above description may be implemented in a general-purpose digital computer, which may be embodied as a program executable on a computer and executes such a program using the non-transitory computer-readable storage medium. Such non-transitory computer-readable storage mediums may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tape, floppy disk, an optical magnetic data storage device, an optical data storage device, hard disk, solid-state disk (SSD), and any device capable of storing instructions or software, associated data, data files, and data structures and providing instructions or software, associated data, data files, and data structures to the processor or the computer such that the processor or the computer may execute instructions.

While one or more examples have been described with reference to the figures, it will be understood by those of ordinary skill in the art that various changes in form and details may be made therein without departing from the spirit and scope as defined by the following claims.

The invention claimed is:
1. A cloud server comprising:
a communicator;
a processor; and
a memory to store instructions executable by the processor,
wherein the processor executes the instructions to:
 convert a voice command received from a user terminal through the communicator into text code blocks supporting a printing service,
 control the communicator to transmit the text code blocks to the user terminal, when replaceable information is included in the text code blocks and corresponds to information stored in the user terminal, receive the corresponding information stored in the user terminal as part of execution of a printing job, and transmit the corresponding information to an image forming apparatus.

2. The cloud server of claim 1, wherein the processor further executes the instructions to:

analyze a relationship between the received voice command and a previous voice command, determine a context of a printing job according to a request of the user terminal, and convert the received voice command into the text code blocks based on the context.

3. The cloud server of claim 1, wherein the processor further executes the instructions to convert the received voice command into the text code blocks based on an instructions mapping table specialized for the printing service.

4. The cloud server of claim 1, wherein the processor further executes the instructions to convert the received voice command into the text code blocks based on a learned language habit of a user.

5. The cloud server of claim 1, wherein the processor further executes the instructions to:

search for at least one text code block corresponding to a command that is similar to a command of the text code blocks in terms of pronunciation or function, and control the communicator to transmit a found at least one text code block to the user terminal.

6. The cloud server of claim 1, wherein the processor further executes the instructions to:

confirm whether voice passwords respectively received from the image forming apparatus and the user terminal that receives an advertising signal repeatedly transmitted by the image forming apparatus match each other, and perform user authentication.

7. The cloud server of claim 6, wherein the voice passwords respectively received from the image forming apparatus and the user terminal comprise sound information generated in the image forming apparatus and a keyword phrase spoken by a user, obtained by the image forming apparatus and the user terminal when the user terminal is located in a predetermined space with the image forming apparatus.

8. The cloud server of claim 6, wherein, when the advertising signal comprises at least one of a Bluetooth low energy (BLE) beacon signal or a wireless fidelity (Wi-Fi) aware signal.

9. A user terminal comprising:

a user interface device;

a communicator;

a processor; and a memory storing instructions executable by the processor, wherein the processor executes the instructions to:

transmit a voice command obtained from a user to a cloud server providing a printing service, control the communicator to receive text code blocks converted from the voice command and supporting the printing service from the cloud server, control the user interface device to display the text code blocks on the user interface device, and when replaceable information is included in the text code blocks and corresponds to information stored in the user terminal, replace the replaceable information with the corresponding information stored in the user terminal as part of execution of a printing job and transmit the corresponding information to an image forming apparatus through the cloud server.

10. The user terminal of claim 9, wherein, in response to a user manipulation selecting one of the text code blocks, the user interface device displays at least one text code block corresponding to a command that is similar to a command of the selected text code block in terms of pronunciation or function below the selected text code block.

11. The user terminal of claim 9, wherein, in response to a user manipulation moving one of the text code blocks, the user interface device changes and displays an order of the text code blocks according to a position of the moved text code block.

12. The user terminal of claim 9, wherein, in response to a user manipulation to overlap any one of sets of text code blocks respectively corresponding to a plurality of voice commands with another set, the user interface device displays the overlapped sets as one merged set of text code blocks.

13. The user terminal of claim 9, wherein the user interface device interacts with a user interface device of the image forming apparatus performing the printing job according to a request for execution of the user terminal and simultaneously processes multiple manipulations of a user for progress of the printing job with the user interface device of the image forming apparatus.

14. The user terminal of claim 13, wherein a real time interaction between the user interface device of the user terminal and the user interface device of the image forming apparatus is performed using a wireless local area network between the user terminal and the image forming apparatus, and wherein printing data for the printing job is transmitted to the image forming apparatus through the cloud server.

15. A cloud server comprising:

a communicator;

a processor; and a memory to store instructions executable by the processor, wherein the processor executes the instructions to:

convert a voice command received from a user terminal through the communicator into text code blocks supporting a printing service, control the communicator to transmit the text code blocks to the user terminal, confirm whether voice passwords respectively received from an image forming apparatus and the user terminal that receives an advertising signal repeatedly transmitted by the image forming apparatus match each other, and perform user authentication.

16. The cloud server of claim 15, wherein the processor further executes the instructions to:

analyze a relationship between the received voice command and a previous voice command, determine a context of a printing job according to a request of the user terminal, and convert the received voice command into the text code blocks based on the context.

17. The cloud server of claim 15, wherein the processor further executes the instructions to convert the received voice command into the text code blocks based on an instructions mapping table specialized for the printing service.

18. The cloud server of claim 15, wherein the processor further executes the instructions to convert the received voice command into the text code blocks based on a learned language habit of a user.

19. The cloud server of claim 15, wherein the processor further executes the instructions to:
   search for at least one text code block corresponding to a command that is similar to a command of the text code blocks in terms of pronunciation or function, and
   control the communicator to transmit a found at least one text code block to the user terminal.

20. The cloud server of claim 15, wherein the voice passwords respectively received from the image forming apparatus and the user terminal comprise sound information generated in the image forming apparatus and a keyword phrase spoken by a user, obtained by the image forming apparatus and the user terminal when the user terminal is located in a predetermined space with the image forming apparatus.

* * * * *